No. 874,082.
PATENTED DEC. 17, 1907.
N. JOERGENSEN.
AUXILIARY CAR SEAT.
APPLICATION FILED APR. 26, 1907.
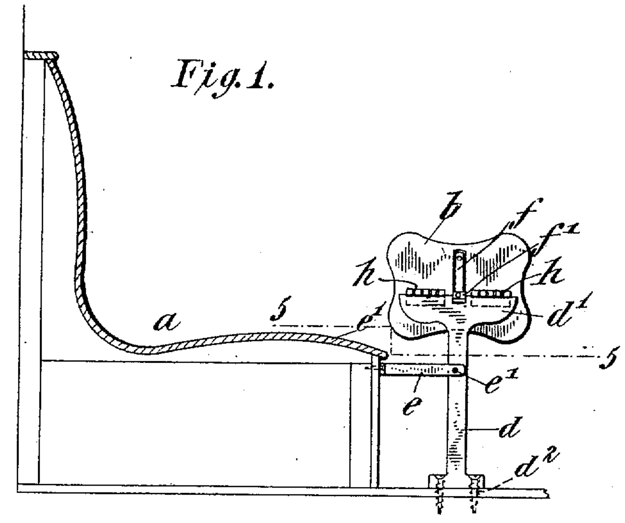
Fig. 1.
Fig. 3.
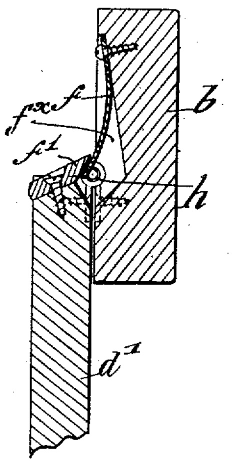
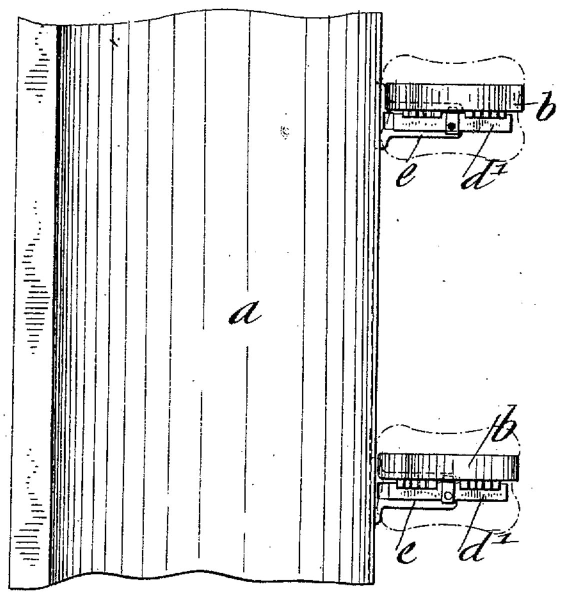
Fig. 2.
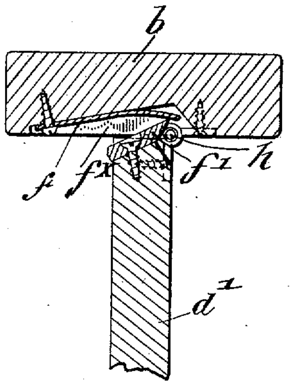
Fig. 4.
Fig. 5.
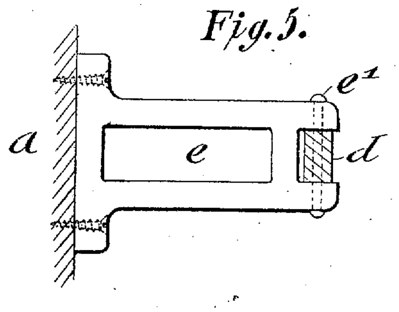
WITNESSES
David Levine
H. J. Suhrbier
INVENTOR
Niels Joergensen
BY Gaucer & Gaepee
ATTORNEYS
THE NORRIS PETERS CO., WASHINGTON, D. C.

UNITED STATES PATENT OFFICE.

NIELS JOERGENSEN, OF WEST HOBOKEN, NEW JERSEY.

AUXILIARY CAR-SEAT.

No. 874,082. Specification of Letters Patent. Patented Dec. 17, 1907.

Application filed April 26, 1907. Serial No. 370,344.

*To all whom it may concern:*

Be it known that I, NIELS JOERGENSEN, a citizen of the United States, residing in West Hoboken, in the county of Hudson and State of New Jersey, have invented certain new and useful Improvements in Auxiliary Car-Seats, of which the following is a specification.

This invention relates to an improved auxiliary car-seat, and more especially to an improvement on the auxiliary car-seat for which Letters Patent were granted to me on April 22, 1890, No. 426,278, the auxiliary seat being intended to be used with car-seats in which no parting-strips are used between the seats, so that the auxiliary seat can be adjusted independently of any connection with the ordinary car-seat; and for this purpose the invention consists in the novel features of construction and combinations of parts which will be fully described hereinafter and finally pointed out in the claims.

In the accompanying drawings, Figure 1 represents a side-elevation of my improved auxiliary car-seat showing it connected with the regular seat, Fig. 2 is a plan-view of Fig. 1, Figs. 3 and 4 are vertical transverse sections, drawn on a larger scale, showing the car-seat respectively in a vertical and horizontal position, and Fig. 5 is a detail horizontal section on line 5, 5, Fig. 1.

Similar letters of reference indicate corresponding parts in the several figures.

Referring to the drawings, *a* represents a regular car-seat of that class which is not separated by parting-strips.

*b* is an auxiliary car-seat which is rounded off at the corners and slightly concaved at the sides, and which is applied by a strong hinge connection *h* to the upper or T-shaped end $d^1$ of an upright standard *d*. The lower enlarged end or base of the standard is attached by screws $d^2$ to the floor of the car. The standard *d* is connected at a point below its T-shaped head by a horizontal brace *e*, which is attached by means of lugs and fastening-screws to the front of the car-seat, and by means of a transverse rivet or pin $e^1$ to the upright standard *d*, the fastenings of the base of the upright standard and the upper part of the same being sufficient to support the upright standard in rigid position.

The auxiliary car-seat *b* is provided with a transverse recess $f^\times$ at its under-side in which a flat spring *f* is fastened at one end, while the free end of the spring engages the beveled edge of an inclined heel $f^1$ that is secured in a recess of the upper T-shaped end of the standard *d*. The spring *f* exerts thereby a tendency on the auxiliary seat to move it and hold it in vertical position.

When the seat is desired for use it is turned over on its hinge-connection with the upright standard into horizontal position by the passenger. As soon as the seat is released it is automatically tilted into vertical position by the spring-connection between the standard and auxiliary seat.

Having thus described my invention, I claim as new and desire to secure by Letters Patent:

1. In a car-seat, the combination of a standard having an inclined heel at its upper end, a seat hinged to said standard, and a flat spring applied to the under surface of said seat and coacting with said heel to normally maintain said seat in a vertical plane.

2. In a car-seat, the combination of a standard having an inclined heel at its upper end, a seat hinged to said standard at said end and having a recess in its under surface, and a flat spring applied to said seat within said recess and coacting with said inclined heel.

3. In a car-seat, the combination of a standard having a T-shaped upper end, a seat, hinges by which said seat is hinged to said end at either side of the center, said standard having an inclined heel between said hinges, and a spring coacting with said heel by which the seat is normally held in vertical position.

In testimony, that I claim the foregoing as my invention, I have signed my name in presence of two subscribing witnesses.

NIELS JOERGENSEN.

Witnesses:
PAUL GOEPEL,
HENRY J. SUHRBIER.